United States Patent
Vanpoulle et al.

(10) Patent No.: US 6,815,004 B2
(45) Date of Patent: Nov. 9, 2004

(54) METHOD OF PRODUCTION OF A COATING COMPOSITION

(75) Inventors: Sophie Vanpoulle, Gif sur Yvette (FR); Frédéric Cariou, Chilly Mazarin (FR); Stanislas Galaj, Arcueil (FR); Xavier Andrieu, Bretigny sur Orge (FR)

(73) Assignee: Alcatel, Paris (FR)

( * ) Notice: Subject to any disclaimer, the term of this patent is extended or adjusted under 35 U.S.C. 154(b) by 138 days.

(21) Appl. No.: 10/097,012

(22) Filed: Mar. 14, 2002

(65) Prior Publication Data
US 2002/0131743 A1 Sep. 19, 2002

(30) Foreign Application Priority Data

Mar. 15, 2001 (EP) .............................. 01400692

(51) Int. Cl.$^7$ ................................. G02B 6/16
(52) U.S. Cl. ..................... 427/163.2; 385/123; 385/128
(58) Field of Search ................. 385/128, 109, 385/123; 359/900; 65/423, 434, 435, 443; 427/163.1, 163.2

(56) References Cited

U.S. PATENT DOCUMENTS

| | | | | |
|---|---|---|---|---|
| 5,181,268 A | * | 1/1993 | Chien | 385/128 |
| 5,754,725 A | | 5/1998 | Kuder et al. | |
| 5,779,758 A | * | 7/1998 | Mann et al. | 65/443 |
| 5,894,035 A | * | 4/1999 | Cinibulk et al. | 427/226 |

FOREIGN PATENT DOCUMENTS

| | | | | |
|---|---|---|---|---|
| DE | 0412242 | * | 2/1991 | G02B/6/16 |
| EP | 0320873 | * | 6/1989 | C03C/25/02 |
| EP | 0 320 873 A2 | | 6/1989 | |
| EP | 0 412 242 A1 | | 2/1991 | |
| GB | 2 268 738 A | | 1/1994 | |

* cited by examiner

Primary Examiner—Frank G. Font
Assistant Examiner—Michael P. Mooney
(74) Attorney, Agent, or Firm—Sughrue Mion, PLLC

(57) ABSTRACT

Method of production of a coating composition useful for covering glass fiber by means of a polymeric composition consisting of an aqueous suspension or emulsion of a polymer. The coating composition is deposited on the glass fiber and, next, the assembly is submitted to a curing process that is carried out at very high temperature and during a very short period of time.

2 Claims, No Drawings

METHOD OF PRODUCTION OF A COATING COMPOSITION

OBJECT OF THE INVENTION

The present invention relates to a method of production of a coating composition and also to the coating itself, which is laid on top of an optical fibre for covering it or safeguarding it. It is of special, but not exclusive application, for manufacturing the covering for optical fibre.

PRIOR ART

A process for producing a composition useful for coating a surface such as a glass fibre, an optical fibre or similar, is known through the patent U.S. Pat. No. 3,862,074 "Aqueous polymeric compositions of non-ionic urethane polymer and acrylic polymer", granted to Richard M. Hichey, and incorporated in the present patent application by reference.

The patent mentioned describes a polymeric composition constituted by a suspension of a polymer in a fluid such as water, that is, the composition employed for coating, for example, an optical fibre is a liquid which has in suspension extremely small particles of the aforementioned polymer, insoluble in the water.

Once the polymeric composition useful for coating surfaces is deposited on the surface mentioned it is subjected to a curing process during a period of 15 to 30 minutes.

The patent U.S. Pat. No. 5,925,462 "Aqueous coating compositions for glass fibers, fiber strands coated with such compositions and optical fiber cable assemblies including such fiber strands", granted to Mikhail M. Girgis, and incorporated in the present patent application by reference, describes a process for production of a double cover or coating for optical fibre.

The composition useful for coating the optical fibre is formed by a double coating, such that the first coating is obtained from an aqueous emulsion or dispersion of an acrylic polymer in a first aqueous solution, and the second coating is obtained from an aqueous emulsion or dispersion of another acrylic polymer, different from the previous acrylic polymer, in a second aqueous solution. The second acrylic polymer is free from urethane.

In the aforementioned, the double coating is formed by an internal layer and an outer layer, both of them made from UV (ultra violet) cured resins.

In such structure, the internal layer having a glass transition temperature (Tg) of no more than about −20° C. and preferably about −30° C. or even lower, and a Young's modulus lower than 2 MPa, preferably 1 MPa or even lower, prevents microbending and an external layer with a relatively high Tg, generally approximately 50° C. and a modulus of about one hundred times higher provides good resistance for fibres handling and cables manufacturing process and installation.

In the prior art, these two layers are not obtained from emulsions but from 100%-solid UV curable resins; they can contain acrylate, urethane, ester, etc.

When UV curable resins are used, the liquid resins are applied on the surface fibre and then a curing process is applied to both layers of coating deposited on the surface of the optical fibre.

The curing process is carried out at a relatively low temperature and lasts for several minutes. As a consequence, there is a need to reduce the production costs of optical fibres, for example through a modification in the curing process of the composition used to coat the optical fibre.

The curing process of the invention guarantees that the covering, at least, retains the characteristics to be found in optical fibre coatings obtained through the slow curing process.

DESCRIPTION OF THE INVENTION

In order to overcome the drawbacks mentioned above, the present invention provides for a method of fabricating a coating useful for covering a optical fibre in such a manner that once the coating has been deposited on the optical fibre, the coating being a polymeric composition consisting of an aqueous suspension or emulsion of a polymer, it is subjected to an ultra fast drying process consisting of applying a high temperature during a very short period of time.

The optical fibre coated by the polymeric composition dried at very high temperature and during a very short period of time offers excellent mechanical properties such as resistance to abrasion, to scratching, to humidity, and the like.

During the optical fibre fabrication process use is made of a coating composition to safeguard the optical fibre from elements and/or actions that could come to damage it or spoil it.

The coating composition is a polymeric composition comprising a suspension of a polymer in a fluid such as water, that is, the polymeric composition is a liquid that holds in suspension extremely small particles of a polymer, said particles being insoluble in water.

The polymeric composition is deposited on the optical fibre in the form of a fine layer or coat that covers the optical fibre entirely. Then, the assembly of optical fibre covered with the polymeric composition is subjected to a flash drying in a furnace such that mechanical properties are precisely adjusted.

The drying process is carried out at a very high temperature about 800° C., e.g. a range about 300 to about 800° C., during a short period of time less than 1 second. The fine layer (50 µm) that coats the optical fibre has good mechanical properties.

A wide range of formulations can be used, based on mechanical grade, nature, particles size, particles distribution, curable or not, etc, with easy rheological behaviour (properties such as plasticity, viscosity or similar) of the polymeric composition (process having a similarity with the vulcanising process of certain substances such as resins and that is carried out using UV light bulbs).

As a consequence, the coating composition useful for coating optical fibre has mechanical characteristics similar to other compositions used for the same purpose and that are subjected to slow drying processes, generally several minutes.

In fact, the production process of the invention is less costly due to the low cost of the polymers in emulsion, compared to UV curable resins.

What is claimed is:

1. A method of providing a coating composition useful for coating optical fibre by means of a polymeric composition consisting of an aqueous suspension or emulsion of a polymer, characterised in that the method comprises the step of subjecting the polymeric composition deposited on the optical fibre to only a high temperature, in the range of about 300° C. to about 800° C., during only a short period of time of less than 1 second.

2. A method of providing a coating composition useful for coating optical fibre by means of a polymeric composition consisting of an aqueous suspension or emulsion of a polymer, characterised in that the method comprises the step of subjecting the polymeric composition deposited on the optical fibre to a high temperature, in the range of about 300° C. to about 800° C., during a short period of time of less than 1 second, and in that the polymeric composition deposited on the optical fibre is subjected to a temperature of about 800° C. during the period of time less than 1 second.

* * * * *